US012583185B2

(12) United States Patent
Diker

(10) Patent No.: US 12,583,185 B2
(45) Date of Patent: Mar. 24, 2026

(54) ULTRASONIC AND VIBRATION WELDING OF THERMOPLASTICS USING A VIBRATABLE TOOL

(71) Applicant: Branson Ultrasonics Corporation, Brookfield, CT (US)

(72) Inventor: Michael Diker, Danbury, CT (US)

(73) Assignee: BRANSON ULTRASONICS CORPORATION, Brookfield, CT (US)

( * ) Notice: Subject to any disclaimer, the term of this patent is extended or adjusted under 35 U.S.C. 154(b) by 0 days.

(21) Appl. No.: 18/195,541

(22) Filed: May 10, 2023

(65) Prior Publication Data

US 2024/0375357 A1 Nov. 14, 2024

(51) Int. Cl.
*B29C 65/08* (2006.01)
*B29C 65/74* (2006.01)
*B29C 65/78* (2006.01)

(52) U.S. Cl.
CPC .......... *B29C 65/08* (2013.01); *B29C 65/7443* (2013.01); *B29C 65/7808* (2013.01)

(58) Field of Classification Search
CPC .. B29C 65/08; B29C 65/7443; B29C 65/7808
See application file for complete search history.

(56) References Cited

U.S. PATENT DOCUMENTS

| | | | | |
|---|---|---|---|---|
| 4,499,845 | A | * | 2/1985 | Pope ......................... B06B 3/00 |
| | | | | 156/580.2 |
| 5,599,411 | A | * | 2/1997 | Schembri .......... B29C 66/30223 |
| | | | | 156/580.2 |
| 5,938,873 | A | | 8/1999 | Bailey et al. |
| 5,948,873 | A | | 9/1999 | Santi et al. |
| 10,160,161 | B2 | * | 12/2018 | Wang ................ B29C 66/73921 |
| 2009/0199951 | A1 | | 8/2009 | Cathcart |
| 2016/0368202 | A1 | | 12/2016 | Crites |

FOREIGN PATENT DOCUMENTS

| | | | |
|---|---|---|---|
| CN | 101522397 | * | 9/2009 |
| DE | 10 2018 220 897 | A1 | 6/2019 |
| JP | 3328166 | B2 | 9/2002 |

OTHER PUBLICATIONS

Extended European Search Report from Corresponding European Application No. 24172204.0, dated Feb. 17, 2025.

* cited by examiner

*Primary Examiner* — Mathieu D Vargot
(74) *Attorney, Agent, or Firm* — Harness, Dickey & Pierce, P.L.C.

(57) ABSTRACT

A system for ultrasonic or vibration welding, staking, swaging, forming or degating of a thermoplastic workpiece includes a vibratable horn having a face, a thermoplastic workpiece, and a vibratable tool positioned between the vibratable horn and the thermoplastic workpiece. The system is configured to energize the vibratable horn to transfer energy from the vibratable horn through the vibratable tool to the thermoplastic workpiece to induce welding, staking, swaging, forming or degating of the thermoplastic workpiece. Optionally, the upper and/or lower surfaces of the vibratable tool may have three-dimensional contour(s) that are complementary to three-dimensional contour(s) of the vibratable horn and/or the thermoplastic workpiece. Additional systems and methods for ultrasonic or vibration welding, staking, swaging, forming or degating of a thermoplastic workpiece are also disclosed.

25 Claims, 13 Drawing Sheets

ULTRASONIC AND VIBRATION WELDING OF THERMOPLASTICS USING A VIBRATABLE TOOL

FIELD

The present disclosure relates to ultrasonic and vibration welding, staking, swaging, forming and degating of thermoplastics using a vibratable tool.

BACKGROUND

This section provides background information related to the present disclosure which is not necessarily prior art.

Ultrasonic welding is a process for joining two or more parts together using high-frequency ultrasonic vibrations. For example, and as shown in FIG. 1, two thermoplastic parts 10, 12 may be sandwiched between a fixture 14 (sometimes called an anvil or nest) and an ultrasonic horn 16 (sometimes called a sonotrode). The horn 16 emits ultrasonic energy that causes melting at the interface of the two plastic parts 10, 12, creating a weld 20.

In addition to the horn 16 shown in FIG. 1, an ultrasonic welder may include a converter, transducer and/or booster (sometimes referred to collectively as an ultrasonic stack), as well as a press for holding the parts 10, 12 together under pressure, an ultrasonic generator and/or a controller.

As shown in FIG. 1, an upper surface 22 of part 10 may be flat (i.e., planar). Likewise, the face 24 of the ultrasonic horn 16, which contacts and delivers ultrasonic energy to the upper surface 22 of part 10, may also be flat. Alternatively, the upper surface 22 of part 10 may have a three-dimensional contour (i.e., with one or more peaks and valleys). In that case, the face 24 of the ultrasonic horn 16 may be provided (e.g., machined or cast) to have a custom three-dimensional contour that is complementary to the three-dimensional contour of the upper surface 22 of part 10, as shown in FIG. 2.

Typically, the ultrasonic horn is coupled to a press that moves the horn in a vertical direction (indicated by arrow 26) between an extended position with the horn in contact with the workpiece (e.g., as shown in FIG. 1), and a retracted position with the horn spaced from the workpiece (e.g., as shown in FIG. 2).

Welding films may be used between the ultrasonic horn 16 and the upper surface 22 of part 10 to act as a buffer and prevent the horn 16 from creating unwanted visible marks on the part 10. These films are typically provided on rolls or spools for use in film feeder mechanisms that pull a new segment of welding film between the horn and each new part to be welded. Because each segment of welding film is used only once, an undesirable amount of waste may be generated during the ultrasonic welding process. Additionally, due to their thin and flexible nature, welding films are susceptible to folding over on themselves, which can result in unwanted visible marks on the part 10.

SUMMARY

This section provides a general summary of the disclosure, and is not a comprehensive disclosure of its full scope or all of its features.

According to the teachings of the present disclosure, a vibratable tool may be positioned between a vibratable horn and a thermoplastic workpiece for transferring energy from the horn, through the vibratable tool, to the workpiece. The vibratable tool may reduce or prevent marking of the thermoplastic workpiece, and may be used for an extended or indefinite period of time to process a large number of thermoplastic workpieces successively and/or simultaneously. The upper surface of the vibratable tool may be flat for interfacing with a flat-faced horn. Alternatively, the upper surface of the vibratable tool may have a three-dimensional contour that is complementary to a three-dimensional contour of the horn. Similarly, the lower surface of the vibratable tool may be flat or have a three-dimensional contour for interfacing with a flat surface or three-dimensional contour on the thermoplastic workpiece. In this manner, the vibratable tool can be used with a flat-faced or contoured horn for processing thermoplastic workpieces having surfaces that are complimentary or non-complimentary to the horn face.

According to one aspect of the present disclosure, a system includes a vibratable horn having a face, a thermoplastic workpiece, and a vibratable tool positioned between the vibratable horn and the thermoplastic workpiece. The system is configured to energize the vibratable horn to transfer energy from the vibratable horn through the vibratable tool to the thermoplastic workpiece to induce welding, staking, swaging, forming or degating of the thermoplastic workpiece.

According to another aspect of the present disclosure, a system includes a vibratable horn having a face, a thermoplastic workpiece, and means for transferring energy from the vibratable horn to the thermoplastic workpiece without contact between the vibratable horn and the thermoplastic workpiece to induce welding, staking, swaging, forming or degating of the thermoplastic workpiece.

According to another aspect of the present disclosure, a method includes positioning a vibratable tool between a vibratable horn and a thermoplastic workpiece, the vibratable tool having an upper surface and a lower surface, and moving at least one of the vibratable horn and the thermoplastic workpiece relative to the other so the lower surface of the vibratable tool contacts an upper surface of the thermoplastic workpiece while the upper surface of the vibratable tool contacts a face of the vibratable horn. The method further includes energizing the vibratable horn to transfer energy from the vibratable horn through the vibratable tool to the thermoplastic workpiece to induce welding, staking, swaging, forming or degating of the thermoplastic workpiece.

Additionally, or alternatively, the method may include using the tool multiple times to process multiple thermoplastic workpieces, and/or using the tool to process multiple thermoplastic workpieces at the same time.

Additionally, or alternatively, the thermoplastic workpiece may include first and second portions, and the method may include using the vibratable tool to induce welding, staking, swaging, forming or degating of the first portion and/or the second portion.

Additionally, or alternatively, the thermoplastic workpiece may include a runner, and the method may include moving at least one of the vibratable horn and the thermoplastic workpiece relative to the other so the lower surface of the vibratable tool contacts the runner while the upper surface of the vibratable tool contacts the face of the vibratable horn.

Additionally, or alternatively, the method may include energizing the vibratable horn at an ultrasonic frequency.

Additionally, or alternatively, the method may include energizing the vibratable horn to produce a weld in the thermoplastic workpiece that extends parallel or perpendicular to the oscillation direction of the vibratable horn.

Additionally, or alternatively, the lower surface of the vibratable tool may be complementary to the upper surface of the thermoplastic workpiece to permit substantially uniform contact between the lower surface of the vibratable tool and the upper surface of the thermoplastic workpiece during the energizing.

Additionally, or alternatively, the upper surface of the thermoplastic workpiece may have a three-dimensional contour, and the lower surface of the vibratable tool may have a three-dimensional contour that is complementary to the three-dimensional contour of the upper surface of the thermoplastic workpiece.

Additionally, or alternatively, the face of the vibratable horn may have a three-dimensional contour, and the upper surface of the vibratable tool may have a three-dimensional contour that is complementary to the three-dimensional contour of the horn face.

Additionally, or alternatively, the face of the vibratable horn may be substantially planar.

Additionally, or alternatively, the vibratable tool may comprise one or more metals, thermoplastics and/or thermoset plastics.

Additionally, or alternatively, the method may include producing the vibratable tool using an additive or subtractive manufacturing process.

Additionally, or alternatively, the method may include supporting the vibratable tool and/or the thermoplastic workpiece with a fixture during the energizing. Further, the fixture may include one or more adjustable alignment members.

Additionally, or alternatively, the vibratable tool may be coupled to the horn.

According to another aspect of the present disclosure, an ultrasonic welding system for a thermoplastic workpiece includes an ultrasonic horn having a face, and a thermoplastic workpiece including at least a first portion and a second portion. The first portion and the second portion each have an upper surface and a lower surface. The upper surface of the first portion has a three-dimensional contour, and the lower surface of the first portion contacts the upper surface of the second portion at one or more locations. The system further includes a vibratable tool positioned between the face of the ultrasonic horn and the upper surface of the first portion of the thermoplastic workpiece. The vibratable tool includes an upper surface and a lower surface. The lower surface of the vibratable tool has a three-dimensional contour that is complementary to the three-dimensional contour of the upper surface of the first portion of the thermoplastic workpiece. The system is configured to energize the ultrasonic horn to transfer energy from the ultrasonic horn, through the vibratable tool, and to said one or more locations to ultrasonically weld the first portion of the thermoplastic workpiece to the second portion of the thermoplastic workpiece.

According to another aspect of the present disclosure, an ultrasonic welding system for thermoplastic workpieces includes an ultrasonic horn having a face, and a thermoplastic workpiece including at least a first portion and a second portion. The face of the ultrasonic horn has a three-dimensional contour. The first and second portions of the thermoplastic workpiece each have an upper surface and a lower surface. The lower surface of the first portion contacts the upper surface of the second portion at one or more locations. The system further includes a vibratable tool positioned between the ultrasonic horn and the upper surface of the first portion of the thermoplastic workpiece. The vibratable tool includes an upper surface and a lower surface. The upper surface of the vibratable tool has a three-dimensional contour that is complementary to the three-dimensional contour of the face of the ultrasonic horn. The system is configured to energize the ultrasonic horn to transfer energy from the ultrasonic horn, through the vibratable tool, and to said one or more locations to ultrasonically weld the first portion of the thermoplastic workpiece to the second portion of the thermoplastic workpiece.

According to still another aspect of the present disclosure, a method of ultrasonic welding includes positioning a vibratable tool between an ultrasonic horn having a face and a thermoplastic workpiece having at least a first portion and a second portion. The first portion of the thermoplastic workpiece has an upper surface with a three-dimensional contour. The vibratable tool has an upper surface, and a lower surface with a three-dimensional contour that is complementary to the three-dimensional contour of the upper surface of the first portion of the thermoplastic workpiece. The method further includes moving at least one of the ultrasonic horn and the thermoplastic workpiece relative to the other so the lower surface of the vibratable tool contacts the upper surface of the first portion of the thermoplastic workpiece while the upper surface of the vibratable tool contacts the face of the ultrasonic horn, and energizing the ultrasonic horn to transfer energy from the ultrasonic horn through the vibratable tool to the thermoplastic workpiece to form a weld between the first portion and the second portion of the thermoplastic workpiece.

According to yet another aspect of the present disclosure, a method of ultrasonic welding includes positioning a vibratable tool between an ultrasonic horn having a face and a thermoplastic workpiece having at least a first portion and a second portion. The face of the ultrasonic horn has a three-dimensional contour. The vibratable tool has a lower surface, and an upper surface having a three-dimensional contour that is complementary to the three-dimensional contour of the face of the ultrasonic horn. The method further includes moving at least one of the ultrasonic horn and the thermoplastic workpiece relative to the other so the lower surface of the vibratable tool contacts the upper surface of the first portion of the thermoplastic workpiece while the upper surface of the vibratable tool contacts the face of the ultrasonic horn, and energizing the ultrasonic horn to transfer energy from the ultrasonic horn through the vibratable tool to the thermoplastic workpiece to form a weld between the first portion and the second portion of the thermoplastic workpiece.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
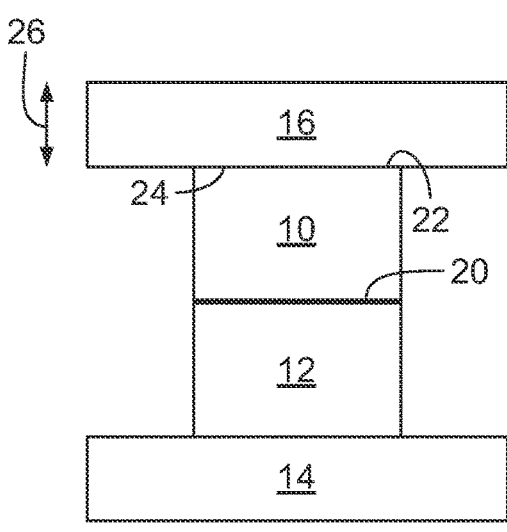
FIG. 1 is a sectional view of an ultrasonic welding system according to the prior art.
Figure 2:
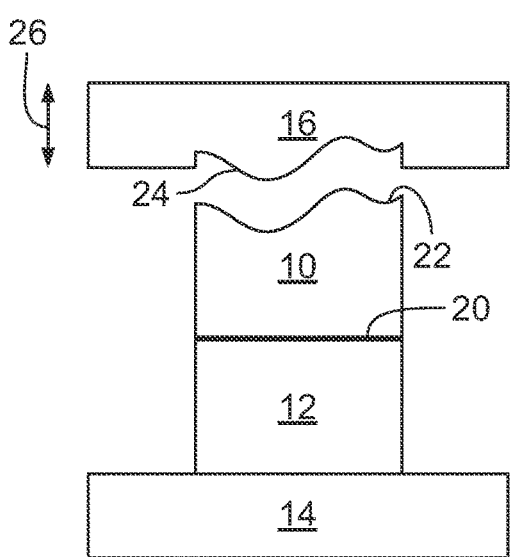
FIG. 2 is a sectional view of an ultrasonic welding system having a contoured horn according to the prior art.

Example embodiments will now be described more fully with reference to the accompanying drawings.

The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
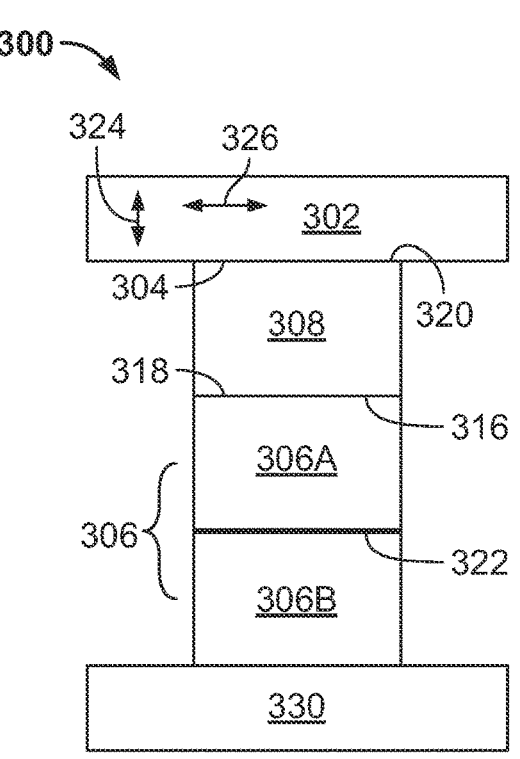
FIG. 3 is a sectional view of a system for ultrasonic or vibration welding, staking, swaging, forming or degating of a thermoplastic workpiece according to one embodiment of the present disclosure.

A system according to one example embodiment of the present disclosure is illustrated in FIG. 3 and indicated generally by reference numeral 300. As shown in FIG. 3, the system 300 includes a vibratable horn 302 having a face 304, a thermoplastic workpiece 306, and a vibratable tool 308 positioned between the vibratable horn 302 and the thermoplastic workpiece 306. The system 300 is configured to energize the vibratable horn 302 to transfer energy from the vibratable horn 302 through the vibratable tool 308 to the thermoplastic workpiece 306 to induce welding of the thermoplastic workpiece. In this manner, the vibratable tool 308 is used as an intermediary device for transferring energy from the vibratable horn 302 to the thermoplastic workpiece 306 as necessary to induce welding.

The vibratable tool 308 prevents the ultrasonic horn 302 from contacting the thermoplastic workpiece 306, and therefore prevents the horn from creating unwanted visible marks on the thermoplastic workpiece. Additionally, and as further explained below, the vibratable tool 308 may be designed to avoid or inhibit marking the thermoplastic workpiece where the vibratable tool contacts the thermoplastic workpiece.

As shown in FIG. 3, the system 300 is adapted for welding a first portion 306A of the thermoplastic workpiece to a second portion 306B of the thermoplastic workpiece. Prior to welding, the first and second portions 306A, 306B may be separate components, or different portions of the same component, as apparent to those skilled in the art.

Figure 4:
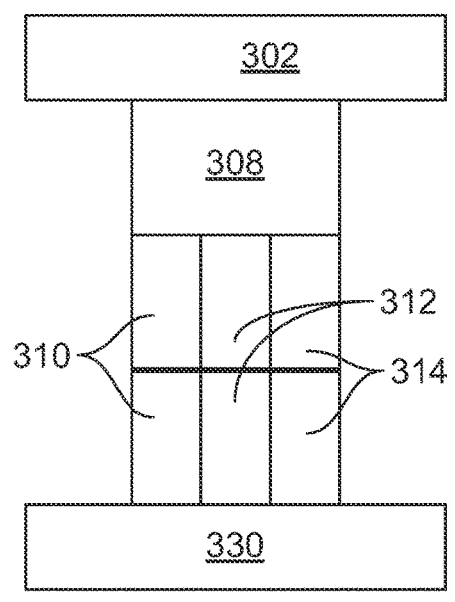
FIG. 4 is a sectional view of a system for processing multiple thermoplastic workpieces at the same time.

Once the vibratable tool 308 is used to induce welding of the workpiece 306 shown in FIG. 3, the tool can be used over and over again to produce welds in a series of workpieces (e.g., in an automated production line process). Similarly, the vibratable tool 308 can be used to produce welds in multiple workpieces 310, 312, 314 at the same time, as illustrated in FIG. 4. Further, because the vibratable tool 308 is reusable for extended or indefinite periods of time, it can be used in place of disposable welding films to reduce waste in the welding process. Alternatively, welding film can be positioned between the vibratable tool 308 and the workpiece 306 to inhibit marking the workpiece.

As shown in FIG. 3, the system 300 may also include a fixture 330 for supporting and/or preventing movement of the thermoplastic workpiece 306 during the welding process.

The system 300 is preferably configured to move at least one of the vibratable horn 302 and the thermoplastic workpiece 306 relative to the other so the lower surface 316 of the vibratable tool 308 contacts an upper surface 318 of the thermoplastic workpiece 306, and the upper surface 320 of the vibratable tool 308 contacts the face 304 of the vibratable horn 302 (as shown in FIG. 3), when the vibratable horn is energized. For example, the system 300 may include a press configured to move the vibratable horn 302 between an extended position (shown in FIG. 3) and a retracted position in which the horn 302 is spaced from the vibratable tool 308 (or the vibratable tool 308 is spaced from the workpiece 306, if the vibratable tool is coupled to the horn, as discussed below). Alternatively, the system 300 may be configured to move, e.g., the thermoplastic workpiece 306, or the fixture 330 supporting the workpiece, between extended and retracted positions.

The system 300 may energize the vibratable horn 302 at an ultrasonic frequency (e.g., 20-40 kHz) to induce ultrasonic welding of the workpiece 306. Alternatively, the system may energize the vibratable horn at a lower frequency to induce vibration welding of the workpiece. As apparent to those skilled in the art, the oscillation direction of the horn is typically perpendicular to the weld 322 (as indicated by arrow 324) for ultrasonic welding, and parallel to the weld 322 (as indicated by arrow 326) for vibration welding. In other embodiments, the oscillation direction of the horn may be in a circumferential or other direction, depending on the particular application.

Figures 5, 6:
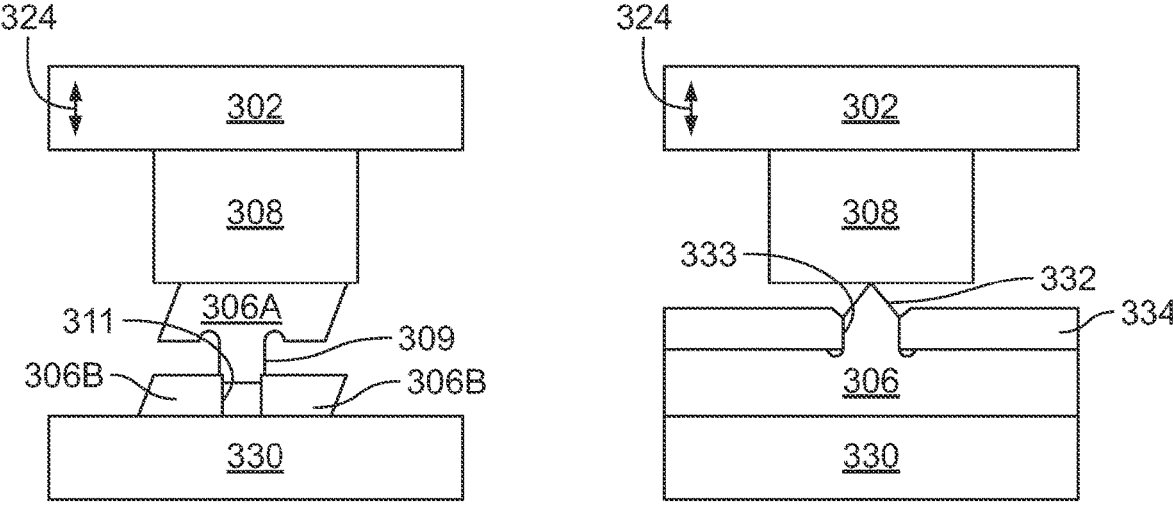
FIG. 5 is a sectional view of a system for stud welding according to another embodiment of the present disclosure.
FIG. 6 is a sectional view of a system for ultrasonic staking according to another embodiment of the present disclosure.

The system 300 of FIG. 3 may be used to produce continuous or intermittent weld(s) between multiple portions of the thermoplastic workpiece 306, depending on the configuration of the workpiece and/or the vibratable tool 308 in any given implementation of these teachings. For example, the first and second portions 306A, 306B of the thermoplastic workpiece may be configured to form one or more stud welding joints, as shown in FIG. 5. High frequency ultrasonic vibrations from the horn 302 are imparted to the first portion 306A of the thermoplastic workpiece via the vibratable tool 308 for driving a molded stud 309 into a hole 311 with an interference fit.

The teachings of this disclosure are not limited to ultrasonic and vibration welding, as the vibratable tool 308 may be readily adapted for other applications including ultrasonic staking, ultrasonic swaging and forming, ultrasonic degating, etc. For example, the thermoplastic workpiece 306 may include a plastic stud 332 (sometimes called a boss) for ultrasonic staking, as shown in FIG. 6. The stud 332 may protrude through a hole 333 in a component 334 that is to be locked in place to the thermoplastic workpiece 306. High frequency ultrasonic vibrations from the horn 302 are imparted to the top of the stud 332 via the vibratable tool 308, for melting the stud and locking the component 334 in place. Although the workpiece 306 is thermoplastic, the component 334 may be a dissimilar material, such as metal, a dissimilar plastic, etc. As apparent to those skilled in the art, ultrasonic staking and/or swaging can also be used to capture one or more additional portions or components between the workpiece 306 and the component 334.

Figure 7:
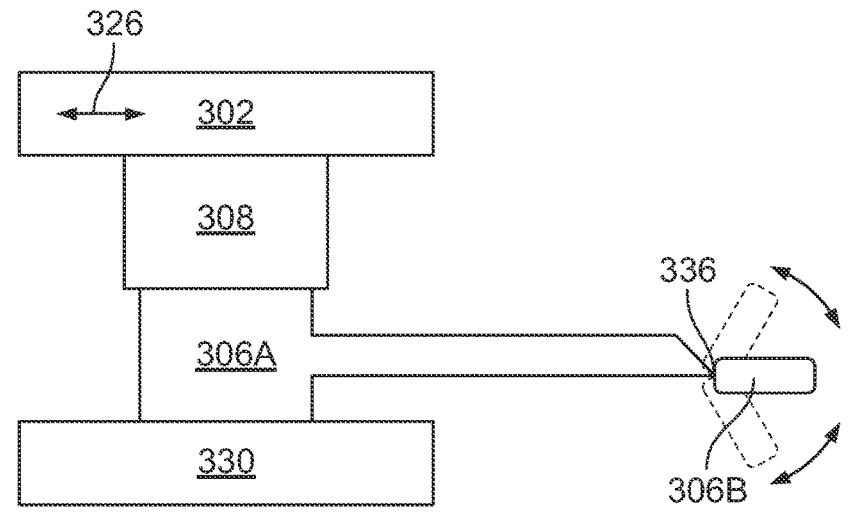
FIG. 7 is a sectional view of a system for ultrasonic degating according to another embodiment of the present disclosure.

The teachings of this disclosure may also be used to separate the first and second portions 306A, 306B of the thermoplastic workpiece using ultrasonic degating, as shown in FIG. 7. In this example, the first portion 306A is configured as a runner, and the second portion 306B is a component to be separated from the runner. High frequency ultrasonic vibrations from the horn 302 are imparted to the runner 306A via the vibratable tool 308, for introducing ultrasonic energy into a gate section 336 joining the runner 306A to the component 306B. This introduces a cyclic bending moment to the component 306B until the component 306B separates from the runner 306A.

The upper and lower surfaces of the vibratable tool 308 preferably have shapes that are complementary to the mating surfaces of the horn 302 and workpiece 306, respectively. In the embodiments shown in, e.g., FIGS. 3 and 4, the upper and lower surfaces of the vibratable tool 308 are flat (i.e., planar), for engaging a planar horn face and a planar workpiece. In other embodiments, the vibratable tool 308 may have one or more contoured surfaces for interfacing with a contoured horn and/or a contoured workpiece.

Figure 8:
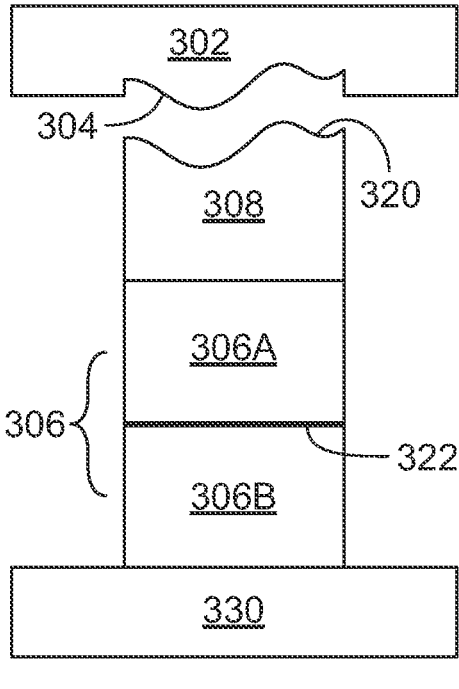
FIG. 8 is a sectional view of a system including a horn and a vibratable tool with complementary contoured surfaces according to another embodiment.

For example, if the face 304 of the vibratable horn 302 has a three-dimensional contour, the upper surface 320 of the vibratable tool 308 may have a three-dimensional contour that is complimentary to the three-dimensional contour of the horn face 304, as shown in FIG. 8. As a result, the vibratable tool 308 may be used to interface the contoured horn 302, which was designed for engaging workpieces with a matching contour, with essentially any workpiece 306 having a flat upper surface, as shown in FIG. 8.

Figure 9:
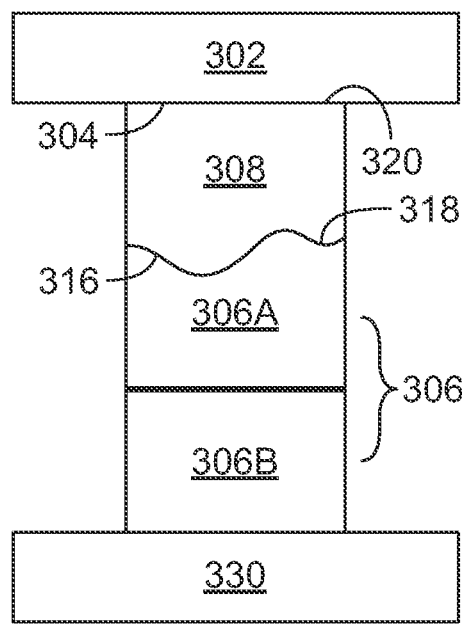
FIG. 9 is a sectional view of a system including a vibratable tool and a workpiece with complementary contoured surfaces according to another embodiment.

Alternatively, the vibratable tool 308 may have a planar upper surface 320 for engaging a flat-faced horn 302, and a contoured lower surface 316 that is complementary to a contoured workpiece 306, as shown in FIG. 9. In this manner, the vibratable tool 308 may be used to interface a flat-faced horn with contoured workpieces, to significantly expand the potential applications of flat-faced horns. At the same time, the vibratable tool may eliminate the need to design and fabricate contoured horns for interfacing with contoured workpieces. Instead of fabricating contoured horns (which requires complicated FEA analysis) for producing custom parts, the vibratable tool 308 can be readily adapted or produced, at a fraction of the cost, for interfacing a flat-faced horn with a contoured workpiece. Similarly, a variety of vibratable tools may be produced (e.g., via 3D printing) for interfacing a flat-faced horn with multiple different workpieces having different three-dimensional contours.

Figure 10:
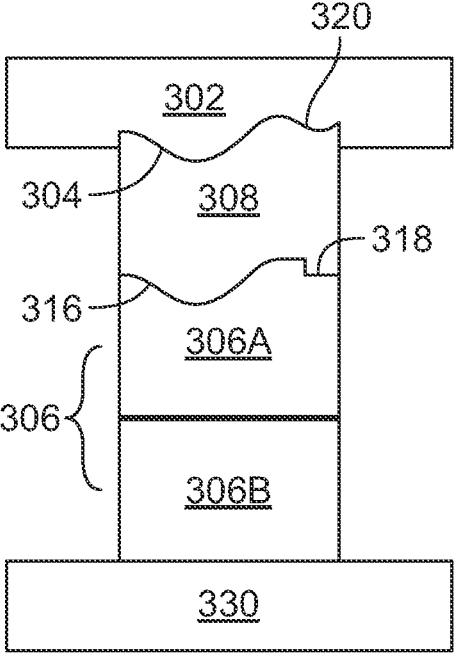
FIG. 10 is a sectional view of a system including a vibratable tool with multiple contoured surfaces.

In other embodiments, the lower and upper surfaces 316, 320 of the vibratable tool 308 may each be contoured for engaging a contoured horn and a contoured workpiece. Further, the contour of the horn face 304 may be different and non-complementary to the workpiece contour, as shown in FIG. 10. As a result, the vibratable tool 308 may be used to interface a preexisting horn 302, that was designed to contact workpieces having a matching contour, with essentially any workpiece having a non-matching contoured upper surface.

Figure 11:
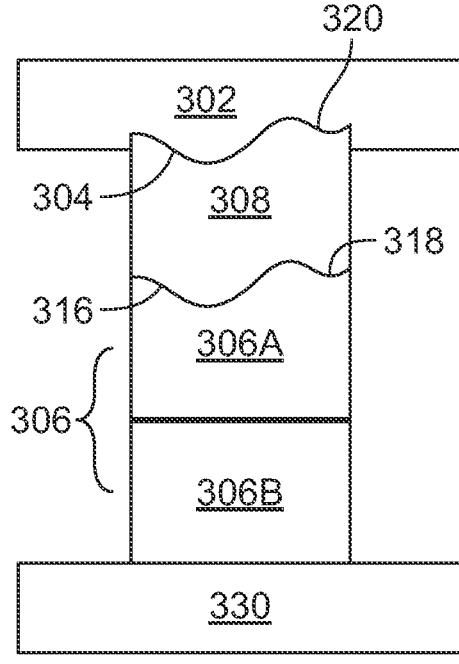
FIG. 11 is a sectional view of a system including a vibratable tool with multiple contoured surfaces and a uniform thickness.

Alternatively, the contour of the horn face 304 may be complimentary to the workpiece, as shown in FIG. 11. In that case, the vibratable tool 308 may have an upper surface 320 that is complementary to the contoured horn 302, and a lower surface 316 that is complementary to the contoured workpiece 306. The vibratable tool 308 may also have a uniform thickness (i.e., in the vertical direction for the example shown in FIG. 11). Accordingly, the vibratable tool 308 may be used, e.g., in place of welding film, to reduce or inhibit marking of the thermoplastic workpiece.

Figure 12:
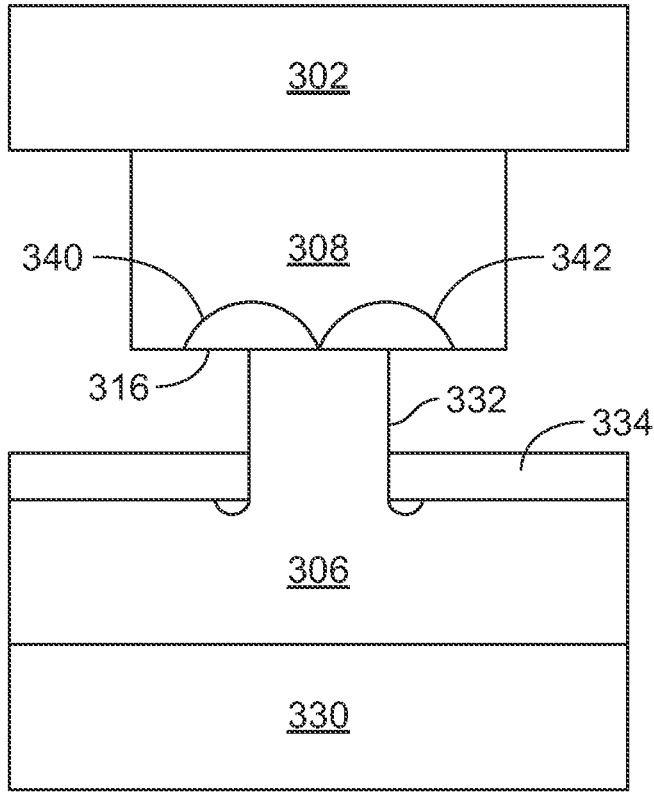
FIG. 12 is a sectional view of a system including a vibratable tool adapted for ultrasonic staking according to yet another example embodiment.

The vibratable tool 308 may also be contoured as desired for implementing various ultrasonic staking configurations. For example, and as shown in FIG. 12, the vibratable tool 308 may be provided with one or more cavities 340, 342 on its lower surface 316. High frequency ultrasonic vibrations from the horn 302 can be imparted to the top of the stud 332 via the vibratable tool 308, to melt and fill the cavities 340, 342 to produce a head that will lock the component 334 in place. The upper surface of the vibratable tool 308 may be flat for engaging a flat-faced horn, as shown in FIG. 12. Alternatively, the upper surface of the vibratable tool and the horn face may have complementary contours as discussed above. As noted above, the component 334 may be a dissimilar material as compared to the thermoplastic workpiece 306, such as metal, a dissimilar plastic, etc.

Figure 13:
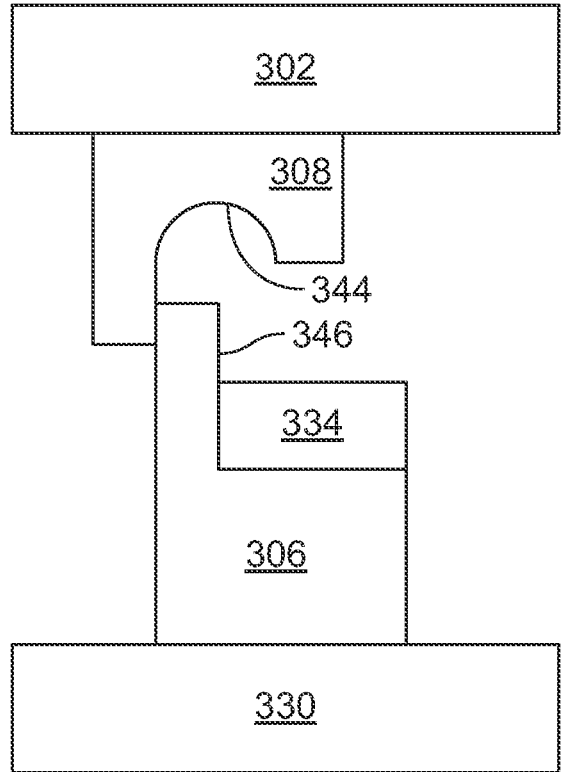
FIG. 13 is a sectional view of a system including a vibratable tool adapted for ultrasonic swaging and forming according to another example embodiment.

Similarly, the vibratable tool 308 may be contoured as desired for performing ultrasonic swaging and forming. For example, and as shown in FIG. 13, the vibratable tool 308 may be provided with a cavity 344 on a lower surface. High frequency ultrasonic vibrations from the horn 302 are imparted to a wall 346 of the thermoplastic workpiece 306 via the vibratable tool, to melt and reform a ridge of plastic over another component 334 in order to capture it mechanically. The upper surface of the vibratable tool 308 may be flat for engaging a flat-faced horn, as shown in FIG. 13. Alternatively, the upper surface of the vibratable tool 308 and the horn face may have complementary contours as discussed above. As apparent to those skilled in the art, ultrasonic staking and/or swaging can also be used to capture one or more additional portions or components between the workpiece 306 and the component 334.

In any implementation in which the vibratable tool 308 has a contoured surface for matching a contoured horn and/or a contoured workpiece, the contoured surface may include a plurality of raised and/or recessed portions (e.g., ridges and valleys), curves, stepped portions and/or sloped portions, as necessary to match the complex and unique surface geometry (i.e, contour) of a particular workpiece.

Further, the vibratable tool 308 may include one or more openings or relief areas 354 for avoiding contact with a port

Figure 15:
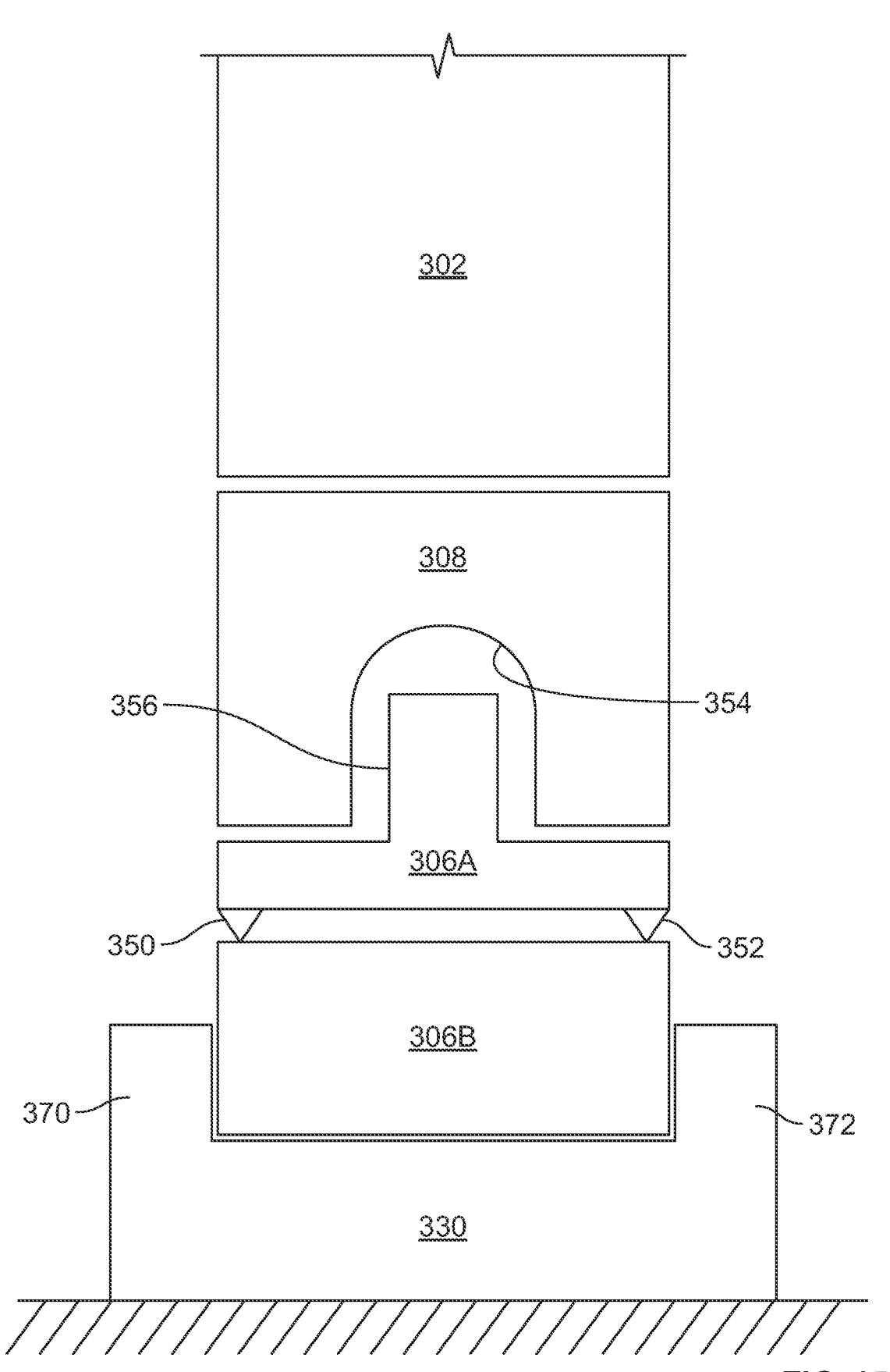
FIG. 15 is a sectional view of a system including a vibratable tool having a
relief for accommodating a workpiece having a port.
Figure 16:
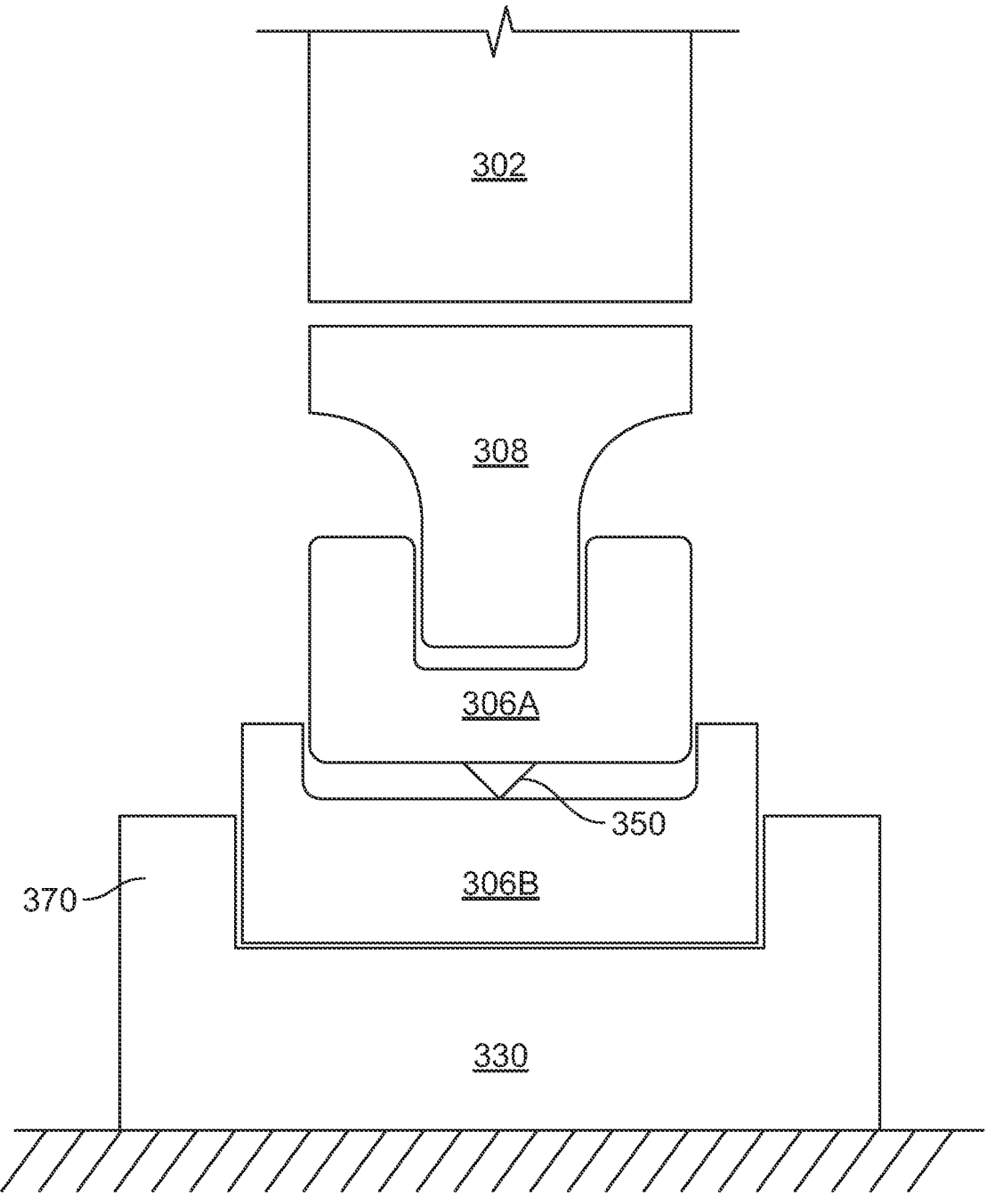
FIG. 16 is a sectional view of a system including a vibratable tool having a lower surface that is narrower than its upper surface.

356 or other features in the thermoplastic workpiece 306, as shown in FIG. 15. Additionally, the portion of the vibratable tool 308 that contacts the workpiece 306 may be more narrow than the portion of the vibratable tool 308 that contacts the horn 302, as shown in FIG. 16. Alternatively, the portion of the vibratable tool 308 that contacts the workpiece 306 may have the same or greater width than the portion of the vibratable tool that contacts the horn 302.

Figure 17:
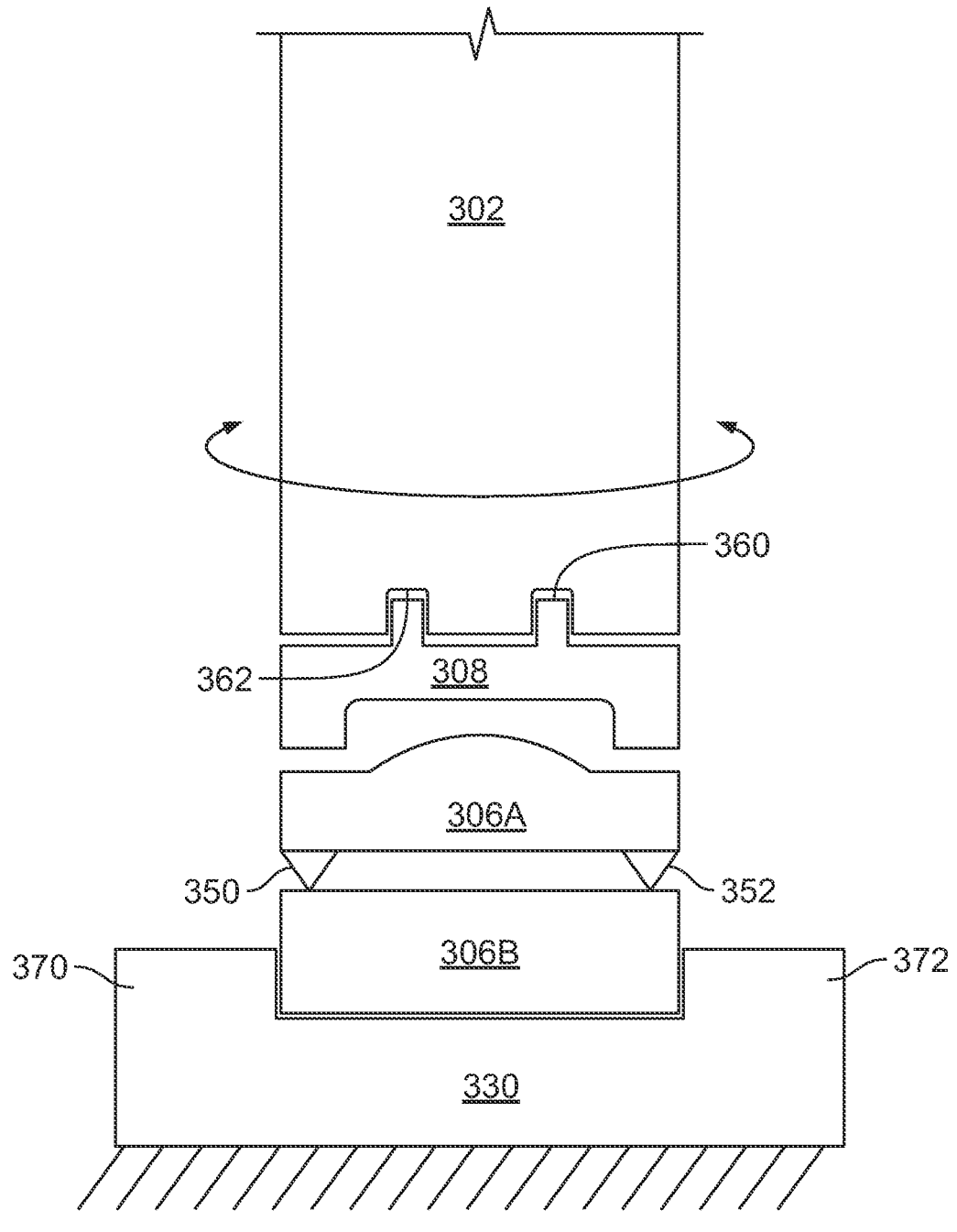
FIG. 17 is a sectional view of a system including a torsional horn according to yet another example embodiment.

Further still, the vibratable tool 308 may be adapted for use with a torsional vibratable horn, which oscillates in a circumferential direction for imparting a torsional vibration. For example, and as shown in FIG. 17, the vibratable tool 308 may include one or more key features (e.g., slots or protuberances 360) for engaging corresponding key features (e.g., protuberances or slots 362) on the horn 302 for transferring the vibrational energy from the horn to the vibratable tool 308.

Figure 18:
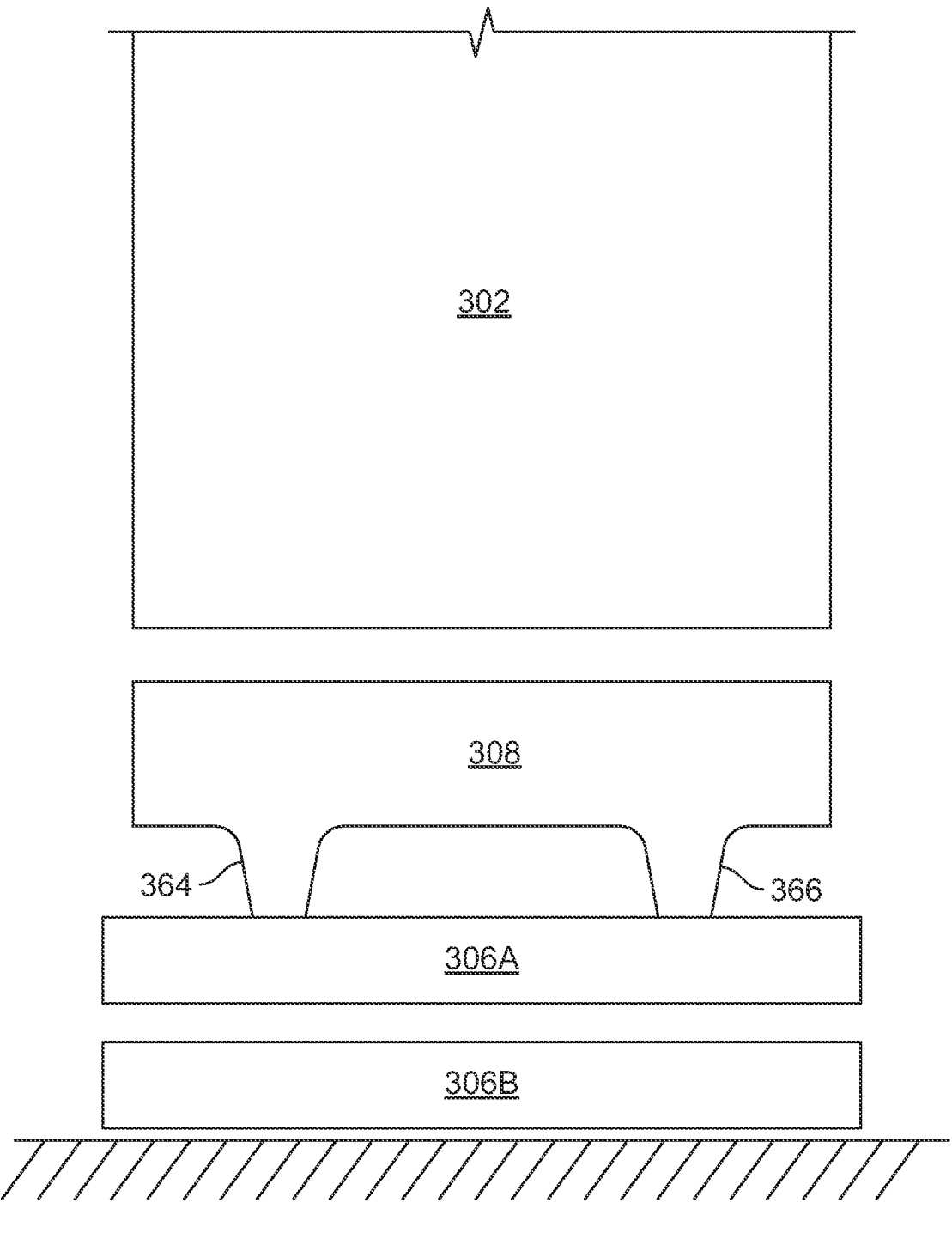
FIG. 18 is a sectional view of a system including a vibratable tool having protuberances for engaging thermoplastic sheets or films.

Additionally, the lower surface of the vibratable tool 308 may be provided with one or more protuberances 364, 366 adapted to contact the thermoplastic workpiece 306, as shown for example in FIG. 18. This may be desirable for various applications, including where the tool 308 is used for ultrasonic or vibration welding of two or more sheets or films 306A, 306B comprising a thermoplastic material (e.g., woven or non-woven textiles or composites comprising a sufficient amount of thermoplastic material for welding).

Figure 14:
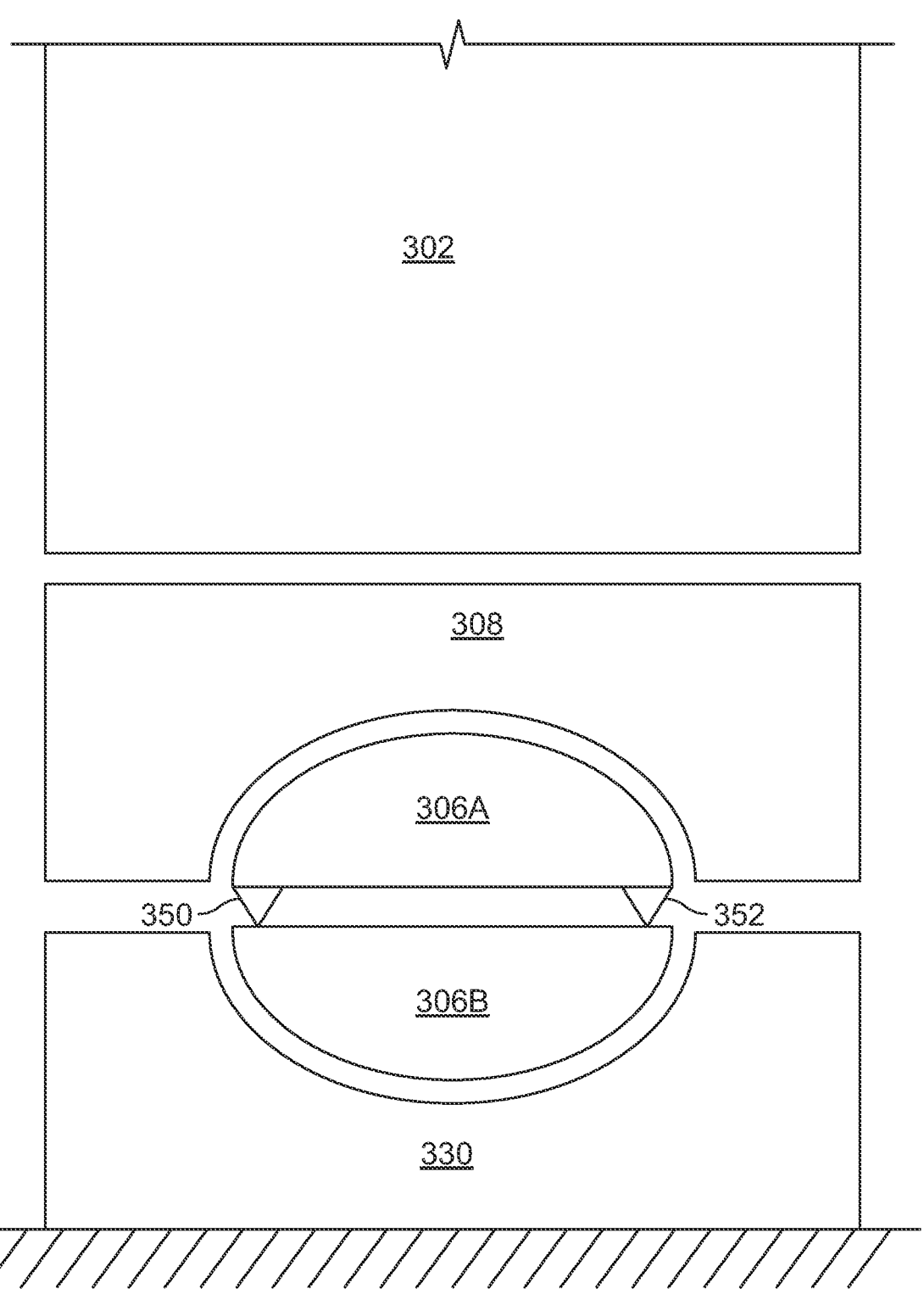
FIG. 14 is a sectional view of a system including a fixture having a contoured surface supporting a contoured workpiece.

In any given implementation, the fixture 330 may include a flat surface for supporting the thermoplastic workpiece 306, as shown for example in FIGS. 3-13. Alternatively, the fixture 330 may have a contoured surface for supporting a contoured workpiece 306, as shown for example in FIG. 14, or may include side walls 370, 372 for retaining the workpiece 306 therebetween, as shown for example in FIGS. 15-17. Additionally, the thermoplastic workpiece 306 may include one or more energy directors 350, 352 in any given implementation, as shown for example in FIGS. 14-17.

Figure 19:
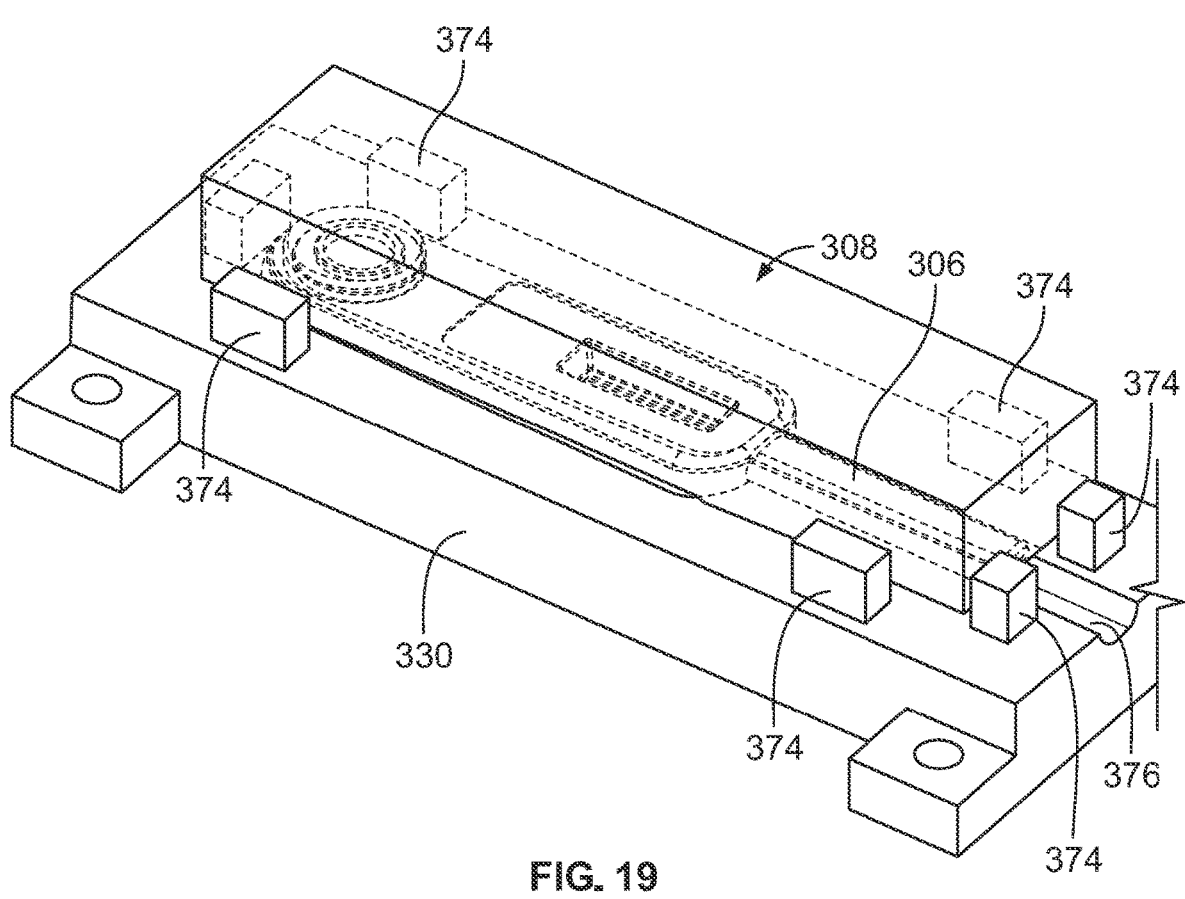
FIG. 19 is an isometric projection view of a system including a fixture having alignment guides for positioning a vibratable tool.

The vibratable tool 308 may rest on and be positioned by the workpiece 306, as shown for example in FIGS. 3 and 9. Additionally, or alternatively, the fixture 330 may be adapted for maintaining the position of the vibratable tool 308 relative to the workpiece 306. For example, in the embodiment of FIG. 19, the fixture 330 includes one or more alignment guides 374 for maintaining the position of the vibratable tool 308 therebetween. The alignment guides 374 are preferably movable between extended positions where the guides do not contact the vibratable tool (to permit the tool and/or the workpiece to be removed from and/or placed within the fixture), and retracted positions (shown in FIG. 19) where the guides 374 contact the vibratable tool 308 and hold the vibratable tool in proper position. Further, the alignment guides 374 may be actuated, e.g., to facilitate an automated production line. Additionally, or alternatively, the fixture 330 may include a part indentation 376 that is complementary to the workpiece 306, as shown in FIG. 19, for receiving and holding the workpiece in proper position.

Figure 20:
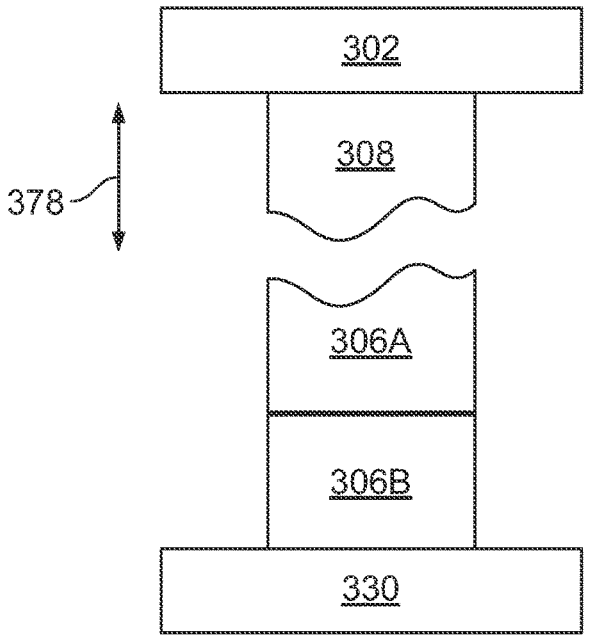
FIG. 20 is a sectional view of a system including a vibratable tool coupled to a vibratable horn.

In other embodiments, the vibratable tool 308 may be coupled to the horn 302, as shown in FIG. 20, and may therefore move with the horn (if the horn is movable relative to the workpiece, as illustrated in FIG. 20 by arrow 378). The vibratable tool 308 may be loosely coupled to the horn 302, so the tool may not resonate with the horn. For example, the vibratable tool may be coupled to the horn (e.g., with fasteners), but spaced from the horn with a gap therebetween, so the tool 308 can vibrate independently of the horn 302. Alternatively, the vibratable tool 308 may be rigidly coupled to the horn 302 via any suitable means such as fasteners (e.g., screws), adhesives, welding, etc. such that the vibratable tool will resonate with the horn. In that event, a mylar sheet (such as BoPET) may be interposed between the horn and the vibratable tool.

The vibratable tool 308 may transfer a maximum amount of energy to the workpiece if the tool resonates with the horn. On the other hand, the vibratable tool is more likely to mark the workpiece at location(s) where the vibratable tool contacts the workpiece if the vibratable tool resonates with the horn. Further, it is not necessary for the vibratable tool 308 to resonate with the horn in order for the vibratable tool to transfer a sufficient amount of vibrational energy to the workpiece to effectuate welding, staking, swaging, forming, degating, etc. If the vibratable tool 308 does not resonate with the horn 302, the horn may be less susceptible to cracking, and may tolerate a higher amplitude, which may be needed in some implementations to compensate for attenuation provided by the vibratable tool.

The vibratable tool 308 may be made from any suitable material(s) including metals (e.g., aluminum or steel), thermoplastics (including glass-filled thermoplastics), thermoset plastics, carbon fiber, etc. In general, the material(s) should be chosen so the tool 308 is sufficiently rigid to transfer the required amount of energy to the workpiece, yet sufficiently compliant to inhibit marking the workpiece. In one example implementation, where the vibratable tool 308 is used to process a workpiece comprising a hard plastic such as ABS plastic, the vibratable tool is formed from an aluminum filled nylon SLS material. In another example implementation, where the vibratable tool 308 is used to process a softer workpiece, such as a workpiece formed from polystyrene, the vibratable tool is formed from a softer material, such as an SLA thermoset plastic that is softer (i.e., more compliant) than an aluminum filled nylon SLS material.

Further, the vibratable tool 308 may be made by any suitable process, including additive manufacturing (e.g., via 3D printing with an SLS or SLA printer), subtractive manufacturing (e.g., using a CNC machine), casting, molding, etc. For best results, the material composition and/or manufacturing technique for the vibratable tool 308 can be selected based on the material composition and/or shape of the workpiece to be processed.

In the event the vibratable tool 308 has one or more contoured surfaces that do not perfectly match the contour of a horn or workpiece, the vibratable tool 308 may be used repeatedly with such horn and/or workpiece until the contour(s) of the vibratable tool more closely match or conform to the contour of the horn and/or workpiece, due to wear-in of the vibratable tool. A three-dimensional scan can then be taken of the vibratable tool 308, and used to produce one or more reproductions of the worn-in tool (e.g, manually, with a 3D printer or CNC machine, etc.), so the reproductions of the worn-in tool more closely match the contours of the horn and/or workpiece, as compared to the original vibratable tool prior to wear-in.

Figure 21:
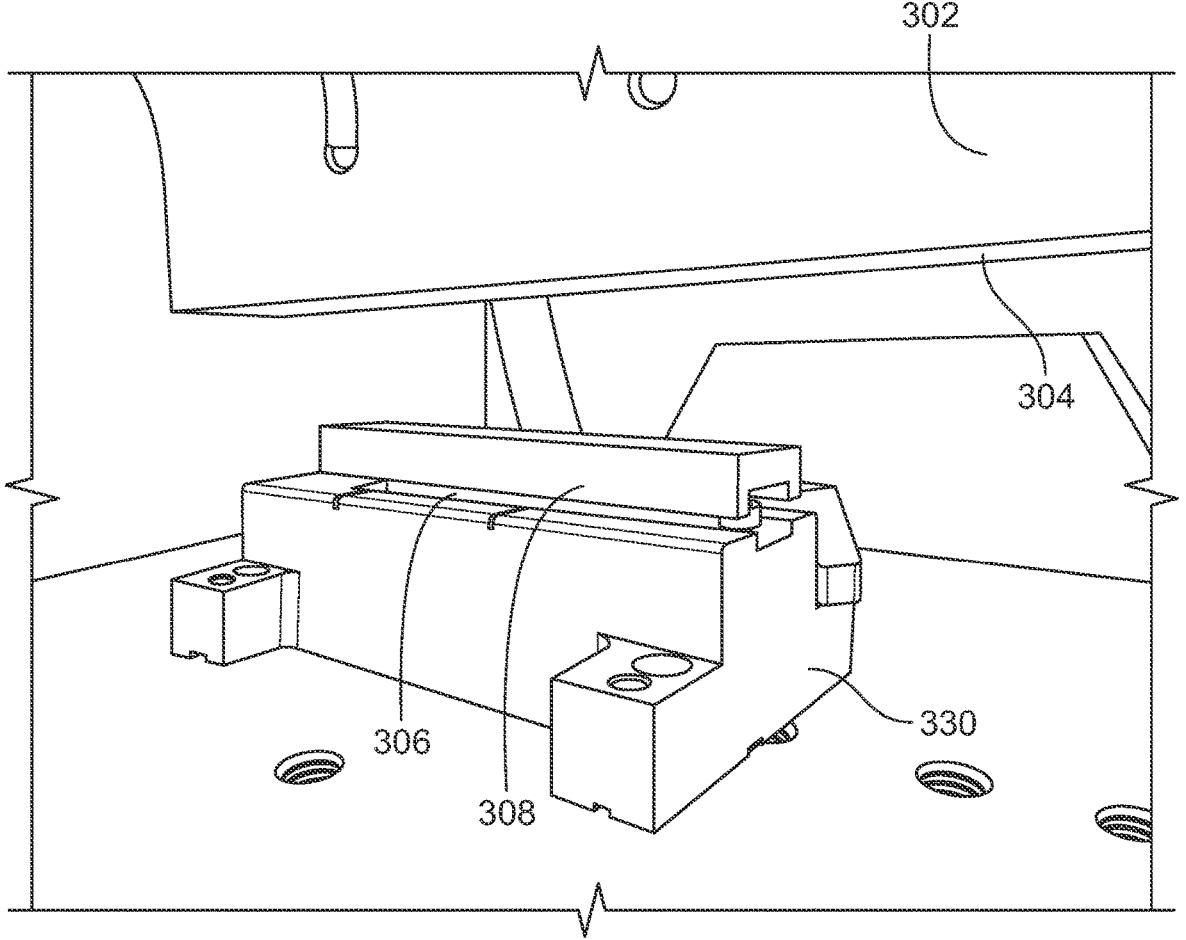
FIG. 21 is an isometric projection view of a system having a contoured vibratable tool according to yet another example embodiment of the present disclosure.
Figure 22:
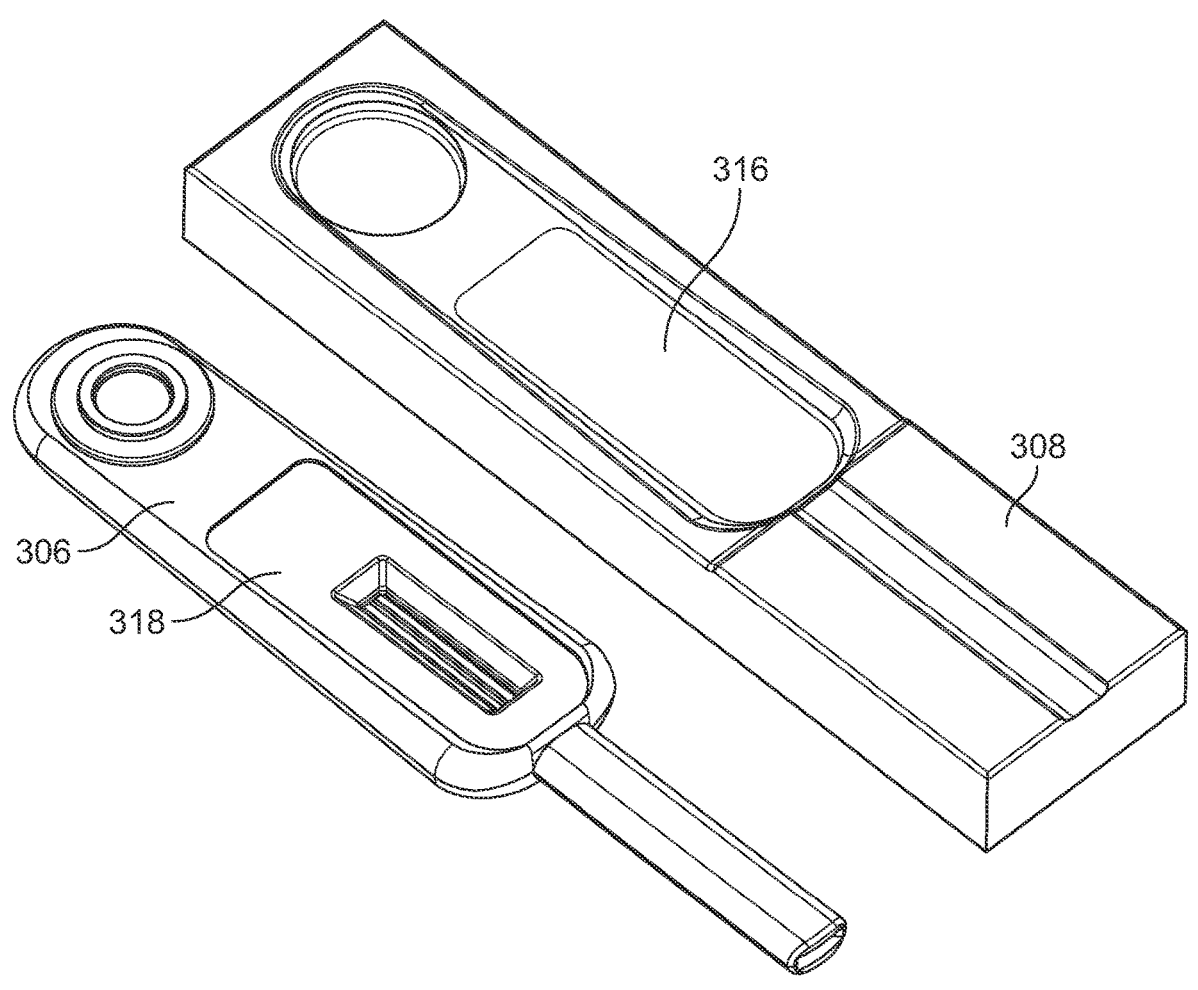
FIG. 22 is a top view of the contoured vibratable workpiece and contoured tool shown in FIG. 21.

FIG. 21 illustrates another embodiment of a system including a vibratable horn 302 having a face 304, a thermoplastic workpiece 306, a vibratable tool 308 positioned between the horn 302 and the workpiece 306, and a fixture 330 for supporting the thermoplastic workpiece 306 and the vibratable tool 308. Further, the lower surface 316 of the vibratable tool 308 has a complex three-dimensional contour that is complementary to the complex three-dimensional contour of the upper surface 318 of the workpiece 306, as shown in FIG. 22.

Figure 23:
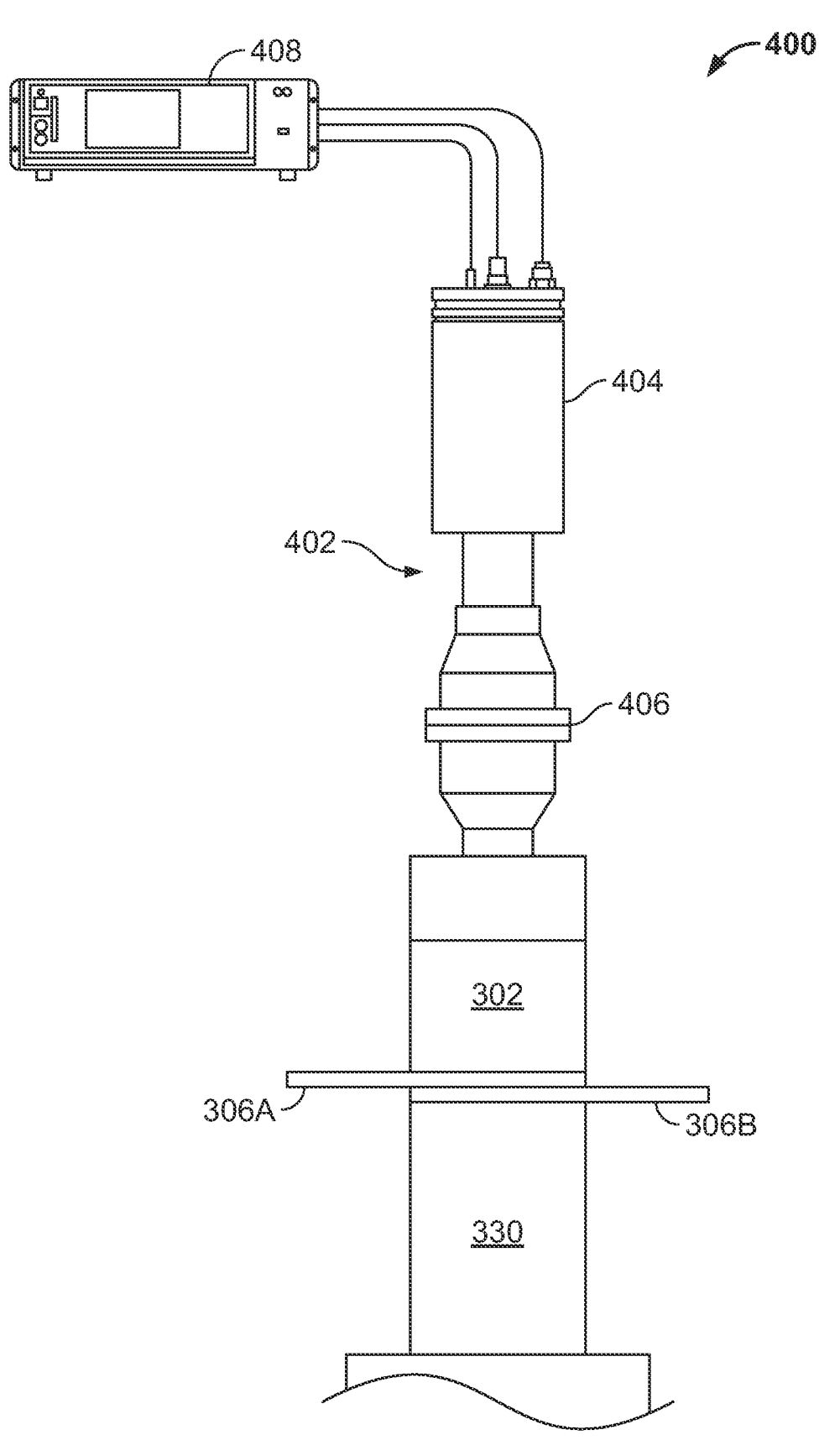
FIG. 23 is a front view of an ultrasonic welder including a vibratable tool according to still another example embodiment of the present disclosure.

As should be apparent, the vibratable horn 302 described herein may be part of an ultrasonic stack in an ultrasonic welder. For example, FIG. 23 illustrates an ultrasonic welder 400 that includes an ultrasonic stack 402 including an ultrasonic transducer 404, a booster 406 and the vibratable horn 302. The welder 400 may also include a controller 408 and a power supply that is preferably integrated with the controller 408. Alternatively, the vibratable horn 302 may be part of a vibration welder, etc. Any suitable welding or vibration machine having a vibratable horn 302 may be employed for performing the welding, staking, swaging, forming, and degating processes described herein.

The vibratable tool 308 described herein and illustrated in the figures may be considered a means for transferring energy from a vibratable horn to a thermoplastic workpiece without contact between the vibratable horn and the thermoplastic workpiece.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system for welding, staking, swaging, forming or degating of a thermoplastic workpiece, comprising:
   a vibratable horn having a face;
   a thermoplastic workpiece including an upper surface and a lower surface; and
   a vibratable tool positioned between the vibratable horn and the thermoplastic workpiece, the vibratable tool including an upper surface and a lower surface;
   wherein the system is configured to energize the vibratable horn to transfer energy from the vibratable horn through the vibratable tool to the thermoplastic workpiece to induce welding, staking, swaging, forming or degating of the thermoplastic workpiece;
   wherein the upper surface of the thermoplastic workpiece has a three-dimensional contour; and
   wherein the lower surface of the vibratable tool has a three-dimensional contour that is complementary to the three-dimensional contour of the upper surface of the thermoplastic workpiece.

2. The system of claim 1, wherein the system is configured to move at least one of the vibratable horn and the thermoplastic workpiece relative to the other so the lower surface of the vibratable tool contacts the upper surface of the thermoplastic workpiece and the upper surface of the vibratable tool contacts the face of the vibratable horn when the vibratable horn is energized.

3. The system of claim 2, wherein the thermoplastic workpiece comprises a first portion and a second portion, and wherein the system is configured to energize the vibratable horn to induce welding, staking, swaging, forming or degating of the first portion and/or the second portion.

4. The system of claim 3, wherein the first portion and the second portion are separate components of the thermoplastic workpiece before the welding, staking, swaging, forming or degating of the thermoplastic workpiece.

5. The system of claim 1, wherein the system is configured to energize the vibratable horn at an ultrasonic frequency.

6. The system of claim 1, further comprising a fixture adapted to support the thermoplastic workpiece and the vibratable tool.

7. A system for welding, staking, swaging, forming or degating of a thermoplastic workpiece, comprising:

a vibratable horn having a face;

a thermoplastic workpiece having an upper surface with a three-dimensional contour; and means for transferring energy from the vibratable horn to the thermoplastic workpiece without contact between the vibratable horn and the thermoplastic workpiece to induce welding, staking, swaging, forming or degating of the thermoplastic workpiece;

wherein the means for transferring energy includes a lower surface having a three-dimensional contour that is complementary to the three-dimensional contour of the upper surface of the thermoplastic workpiece.

8. A method of welding, staking, swaging, forming or degating of a thermoplastic workpiece, comprising:

positioning a vibratable tool between a vibratable horn and a thermoplastic workpiece, the vibratable horn having a face, the vibratable tool having an upper surface and a lower surface;

moving at least one of the vibratable horn and the thermoplastic workpiece relative to the other so the lower surface of the vibratable tool contacts an upper surface of the thermoplastic workpiece while the upper surface of the vibratable tool contacts the face of the vibratable horn; and energizing the vibratable horn to transfer energy from the vibratable horn through the vibratable tool to the thermoplastic workpiece to induce welding, staking, swaging, forming or degating of the thermoplastic workpiece;

wherein the upper surface of the thermoplastic workpiece has a three-dimensional contour; and wherein the lower surface of the vibratable tool has a three-dimensional contour that is complementary to the three-dimensional contour of the upper surface of the thermoplastic workpiece to permit substantially uniform contact between the lower surface of the vibratable tool and the upper surface of the thermoplastic workpiece during the energizing.

9. The method of claim 8 wherein the thermoplastic workpiece is a first thermoplastic workpiece, the method further comprising positioning a second thermoplastic workpiece in place of the first thermoplastic workpiece, moving at least one of the vibratable horn and the second thermoplastic workpiece relative to the other so the lower surface of the vibratable tool contacts an upper surface of the second thermoplastic workpiece while the upper surface of the vibratable tool contacts the face of the vibratable horn, and energizing the vibratable horn to transfer energy from the vibratable horn through the vibratable tool to the second thermoplastic workpiece to induce welding, staking, swaging, forming or degating of the second thermoplastic workpiece.

10. The method of claim 8 wherein positioning includes positioning the vibratable tool between the vibratable horn and a plurality of thermoplastic workpieces, the plurality of thermoplastic workpieces including said thermoplastic workpiece, wherein moving includes moving at least one of the vibratable horn and the plurality of thermoplastic workpieces relative to the other so the lower surface of the vibratable tool contacts upper surfaces of the plurality of thermoplastic workpieces while the upper surface of the vibratable tool contacts the face of the vibratable horn, and wherein energizing includes energizing the vibratable horn to transfer energy from the vibratable horn through the vibratable tool to the plurality of thermoplastic workpieces to induce welding, staking, swaging, forming or degating of each of the plurality of thermoplastic workpieces.

11. The method of claim 8 wherein the thermoplastic workpiece comprises a first portion and a second portion, and wherein the energizing induces welding, staking, swaging, forming or degating of the first portion and/or the second portion.

12. The method of claim 11 wherein the first portion and the second portion are separate components of the thermoplastic workpiece before the energizing.

13. The method of claim 8 wherein energizing includes energizing the vibratable horn at an ultrasonic frequency.

14. The method of claim 13 wherein the thermoplastic workpiece includes a runner, and wherein moving includes moving at least one of the vibratable horn and the thermoplastic workpiece relative to the other so the lower surface of the vibratable tool contacts the runner while the upper surface of the vibratable tool contacts the face of the vibratable horn.

15. The method of claim 8 wherein energizing includes energizing the vibratable horn to produce a weld in the thermoplastic workpiece, the weld extending parallel to the oscillation direction of the vibratable horn.

16. The method of claim 8 wherein the three-dimensional contour of the upper surface of the thermoplastic workpiece comprises one or more sloped portions.

17. The method of claim 8 wherein the face of the vibratable horn has a three-dimensional contour, and wherein the upper surface of the vibratable tool has a three-dimensional contour that is complementary to the three-dimensional contour of the face of the vibratable horn to permit substantially uniform contact between the upper surface of the vibratable tool and the face of the vibratable horn.

18. The method of claim 17 wherein the three-dimensional contour of the vibratable horn comprises one or more sloped portions.

19. The method of claim 8 wherein the face of the vibratable horn is substantially planar.

20. The system of claim 7 wherein the face of the vibratable horn has a three-dimensional contour, and wherein the means for transferring energy includes an upper surface having a three-dimensional contour that is complementary to the three-dimensional contour of the face of the vibratable horn to permit substantially uniform contact between the upper surface of the vibratable tool and the face of the vibratable horn.

21. The system of claim 20 wherein the three-dimensional contour of the vibratable horn comprises one or more sloped portions.

22. The system of claim 7 wherein the face of the vibratable horn is substantially planar.

23. The system of claim 1, wherein the face of the vibratable horn has a three-dimensional contour, and wherein the upper surface of the vibratable tool has a three-dimensional contour that is complementary to the three-dimensional contour of the face of the vibratable horn.

24. The system of claim 23 wherein the three-dimensional contour of the vibratable horn comprises one or more sloped portions.

25. The system of claim 1, wherein the face of the vibratable horn is substantially planar.

* * * * *